Feb. 3, 1948.     I. KOLODNER ET AL     2,435,225
ANGULARLY-ADJUSTABLE HANDLE FOR HAND SAWS
Filed March 30, 1944
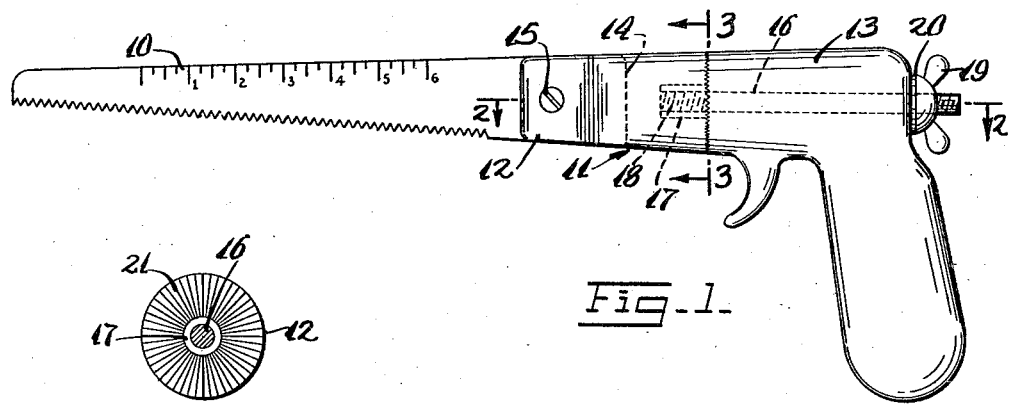
Fig. 1.
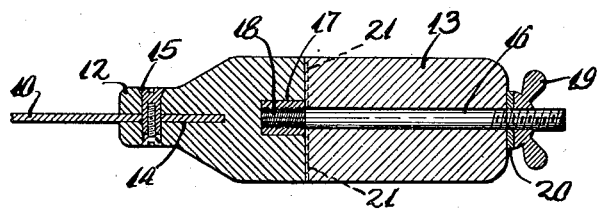
Fig. 3.
Fig. 2.
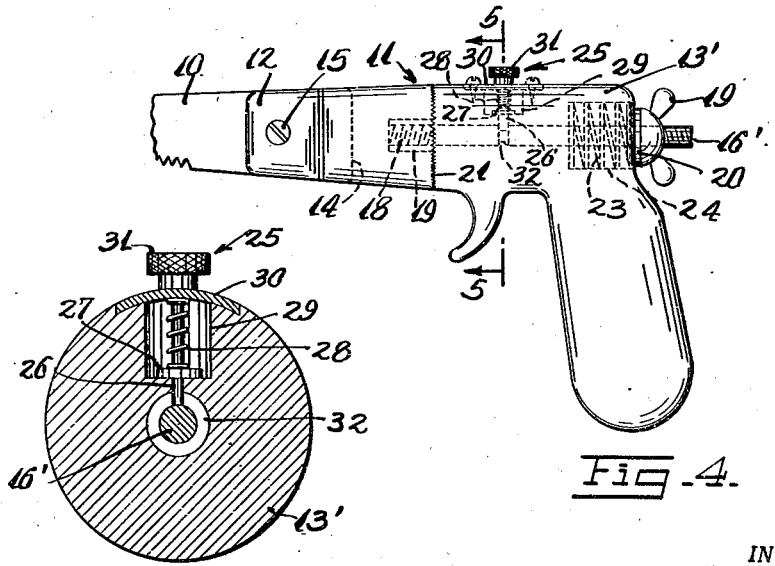
Fig. 4.
Fig. 5.
INVENTORS
Irving Kolodner
Joseph Munves
BY
ATTORNEY Patented Feb. 3, 1948

2,435,225

UNITED STATES PATENT OFFICE 2,435,225

ANGULARLY ADJUSTABLE HANDLE FOR HAND SAWS

Irving Kolodner, Brooklyn, and Joseph Munves, New York, N. Y.

Application March 30, 1944, Serial No. 528,684

1 Claim. (Cl. 145—111)

This invention relates to new and useful improvements in a universal hand saw.

More particularly, the invention proposes the construction of an improved universal hand saw which is characterized by a handle for supporting the blade of said saw, and said handle consisting of a front section attached to said blade and a back section adjustably connected with the front section in a certain way.

More specifically, the invention proposes to provide the front section with a stud which engages through the back section, and proposes to form the adjacent faces of the sections with complementary inter-engaging serrations radially of said stud, and furthermore proposes to provide a wing nut threadedly mounted on the stud for clamping said sections together.

The invention also proposes a modified form. In the modified form it is contemplated to provide a latch for releasably connecting the back section of the handle with the stud to hold it against longitudinal motion while permitting relative turning thereof.

For further comprehensions of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a side elevational view of a universal hand saw constructed in accordance with this invention.

Fig. 2 is a fragmentary sectional view taken on the line 2—2 of Fig. 1.

Fig. 3 is a transverse sectional view taken on the line 3—3 of Fig. 1.

Fig. 4 is a fragmentary side elevational view of a universal hand saw constructed in accordance with another form of this invention.

Fig. 5 is a fragmentary vertical sectional view taken on the line 5—5 of Fig. 4.

The universal hand saw, in accordance with this invention, includes a saw blade 10 of any design and construction. A handle 11 is provided for said saw blade. This handle consists of a front section 12 and a back section 13 adjacent said front section.

The front section 12 of the handle 11 is formed with a slot 14 extended inwards from its front end. A clamp screw 15 is engaged through the front end of the section 12 for releasably holding the saw blade 10 in position.

A stud 16 is turnably mounted upon said front section 12 and engages through a passage in the back section 13. The front section 12 is provided with a threaded bushing 17 for receiving the threaded front end 18 of the stud 16. The back end of the stud 16 is also provided with threads which are engaged by a wing nut 19 for holding the sections 12 and 13 clamped together. A washer 20 is located beneath the wing nut 19.

The adjacent faces of the sections 12 and 13 of said handle 11 are formed with complementary interengaging serrations 21 extending radially of the stud 16.

The operation of the improved hand saw is as follows:

The wing nut 19 may be loosened and the back section 13 may be turned to various positions upon the stud 16. When the wing nut is screwed down tight the serrations will re-engage each other, holding the handle 13 as positioned.

In Figs. 4 and 5 a modified form of the invention has been disclosed which is very similar to the prior form, distinguishing in the fact that resilient means in the nature of a spring 23 is interposed between the washer 20 of the wing nut 19 and the back section 13'. More specifically, the back section 13' has a recess 24 in which the spring 23 engages. A latch 25 releasably connects the back section 13' with the stud 16' restraining the back section 13' from moving longitudinally rearwards. The latch 25 includes a bolt 26 having a collar 27 against which a spring 28 abuts. The spring 28 is contained within a recess 29 formed in the side of the back section 13'. The spring 28 acts against a plate 30 mounted across the recess 29. The bolt 26 extends from the plate 30 and is provided with a head 31 by which it may be manually pulled out a short distance. The inner end of the bolt 26 engages a groove 32 formed around the stud 16'. In other respects this form of the invention is similar to that previously shown and like reference numerals identify like parts in each of the several views.

The latch 25 may be opened by manually pulling the head 31 a short distance to disengage the bolt 26 from the recess 32. Then the back section 13' may be moved longitudinally rearwards slightly compressing the spring 23 and disengaging the serrations 21. The back section 13 may now be turned to selected rotative positions. When released, the spring 23 will urge the back section 13' forwards and the latch 25 will re-engage the recess 32, locking the back section 35 in its new position.

While we have illustrated and described the preferred embodiments of our invention, it is to be understood that we do not limit ourselves to the precise constructions herein disclosed and the right is reserved to all changes and modifications coming within the scope of the invention as defined in the appended claim.

Having thus described our invention, what we claim as new and desire to secure by United States Letters Patent is:

A universal hand saw having a saw blade formed with a handle of separate sections including a front section attached to said blade and from which a stud extends and upon which a back section is rotatively mounted, and means for holding said back section in selected turned positions relative to said front section, comprising interengageable serrations between the adjacent faces of said sections for holding the back section against turning when engaged, a nut mounted on the end of said stud projected beyond the back of said back section, a spring mounted on said stud and operating between the adjacent faces of said nut and back section urging said back section towards said front section causing the serrations to engage each other, whereby the back section may be moved from said front section against the action of said spring disengaging said serrations freeing said back section to be turned relative to said front section, and means for holding said back section against moving away from said front section, comprising a bolt on said back section engageable with a complementary groove formed in said stud, and resilient means urging said bolt to maintain an engaged position with said groove, whereby the bolt may be pulled free of the groove freeing said back section.

IRVING KOLODNER.
JOSEPH MUNVES.

REFERENCES CITED

The following references are of record in the file of this patent:

UNITED STATES PATENTS

| Number | Name | Date |
|---|---|---|
| 1,395,957 | Griffin | Nov. 1, 1921 |
| 1,731,383 | Koen | Oct. 15, 1929 |
| 703,334 | Carey | June 24, 1902 |
| 1,119,787 | Pause | Dec. 1, 1914 |
| 1,490,025 | Reynolds | Apr. 8, 1924 |
| 1,812,928 | Bundy | July 7, 1931 |
| 2,286,530 | Fordon | June 16, 1942 |
| 170,970 | Tanner | Dec. 14, 1875 |
| 264,017 | Winterbottom | Sept. 5, 1882 |
| 493,823 | Ely | Mar. 21, 1893 |